May 1, 1956  P. R. POWELL  2,743,633
APPARATUS FOR REMOVING JACKET SECTIONS
FROM JACKETED ARTICLES
Filed July 17, 1953                                           9 Sheets-Sheet 1
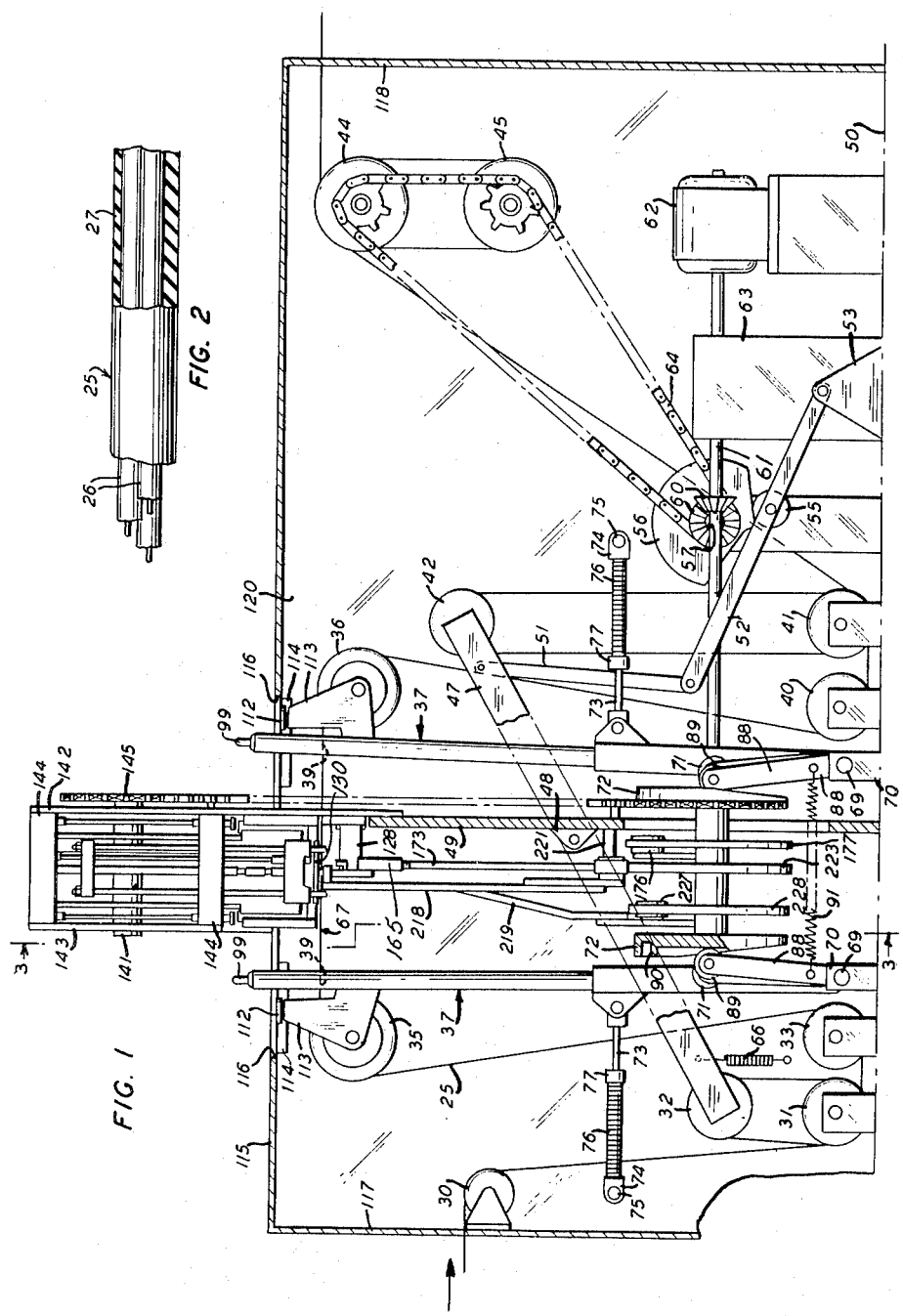
INVENTOR
P. R. POWELL May 1, 1956

P. R. POWELL 2,743,633

APPARATUS FOR REMOVING JACKET SECTIONS
FROM JACKETED ARTICLES

Filed July 17, 1953

INVENTOR
P. R. POWELL

INVENTOR
P. R. POWELL

May 1, 1956 P. R. POWELL 2,743,633
APPARATUS FOR REMOVING JACKET SECTIONS
FROM JACKETED ARTICLES
Filed July 17, 1953 9 Sheets—Sheet 4

INVENTOR
P. R. POWELL

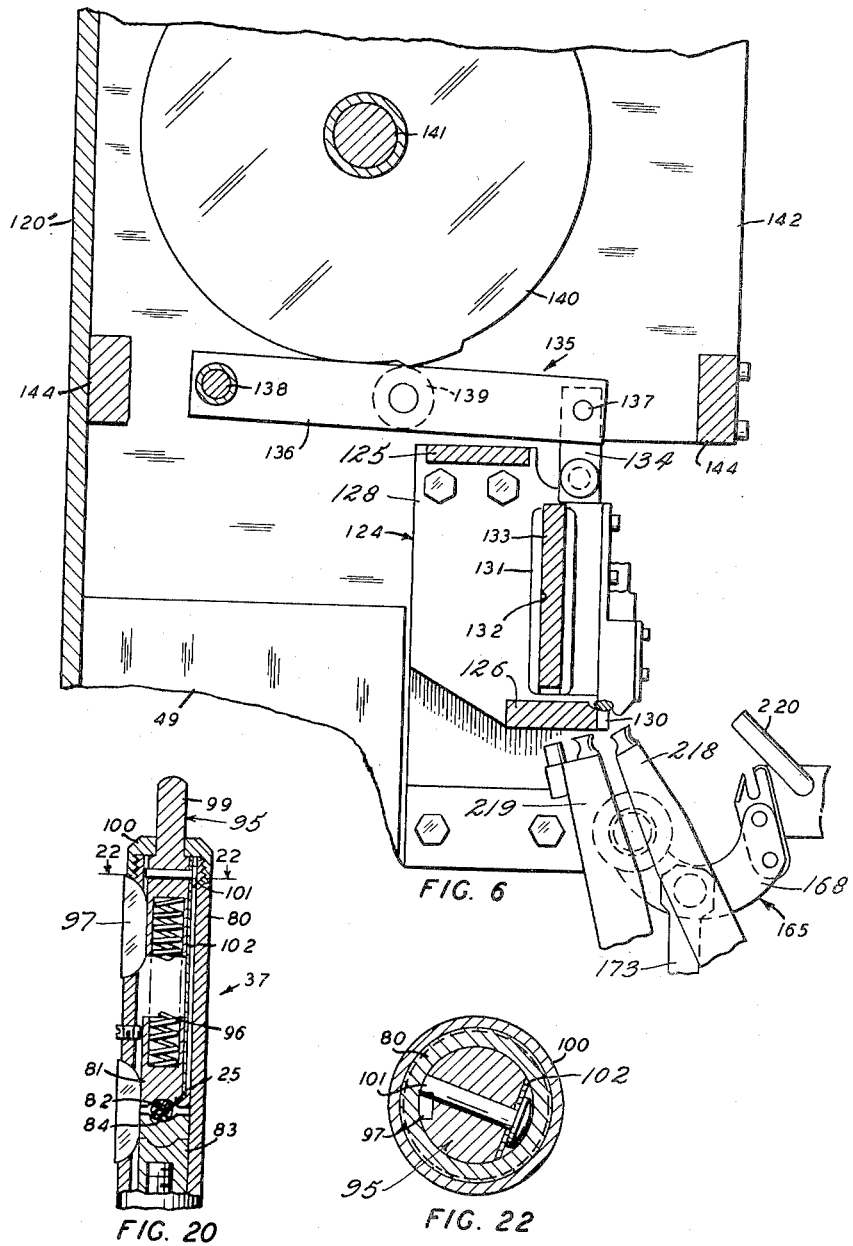

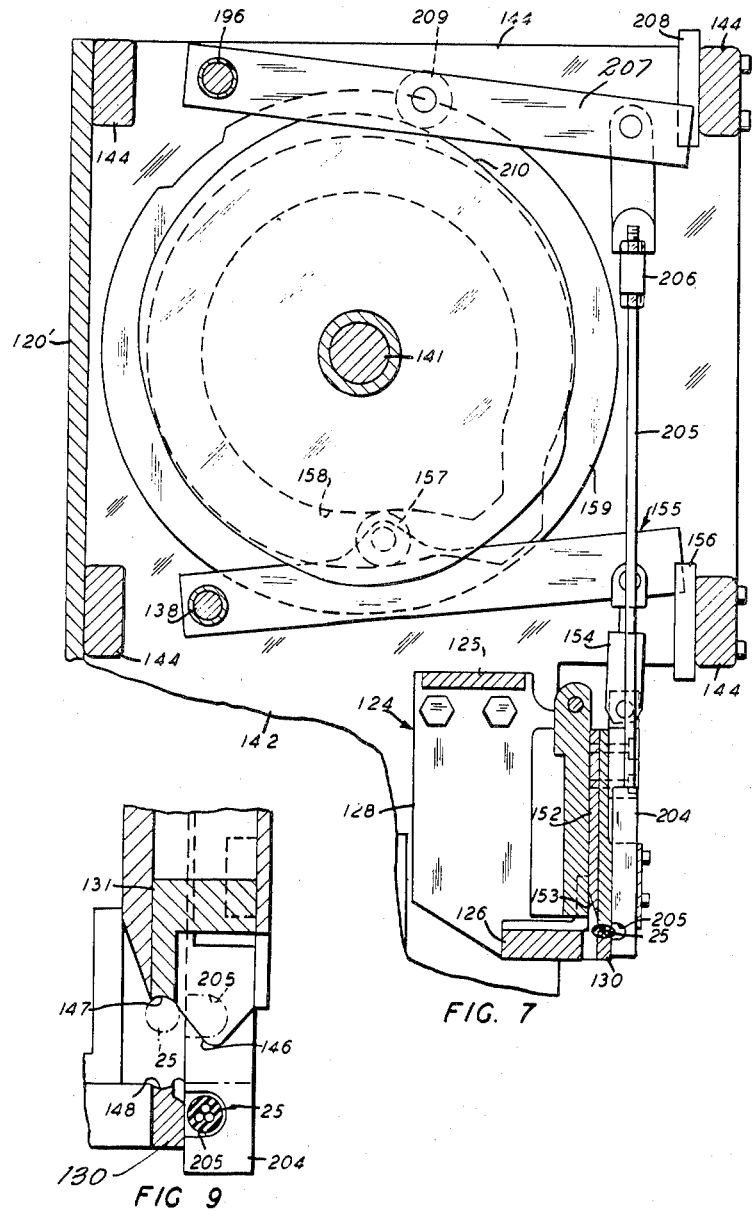

May 1, 1956
P. R. POWELL
2,743,633
APPARATUS FOR REMOVING JACKET SECTIONS
FROM JACKETED ARTICLES
Filed July 17, 1953
9 Sheets-Sheet 7
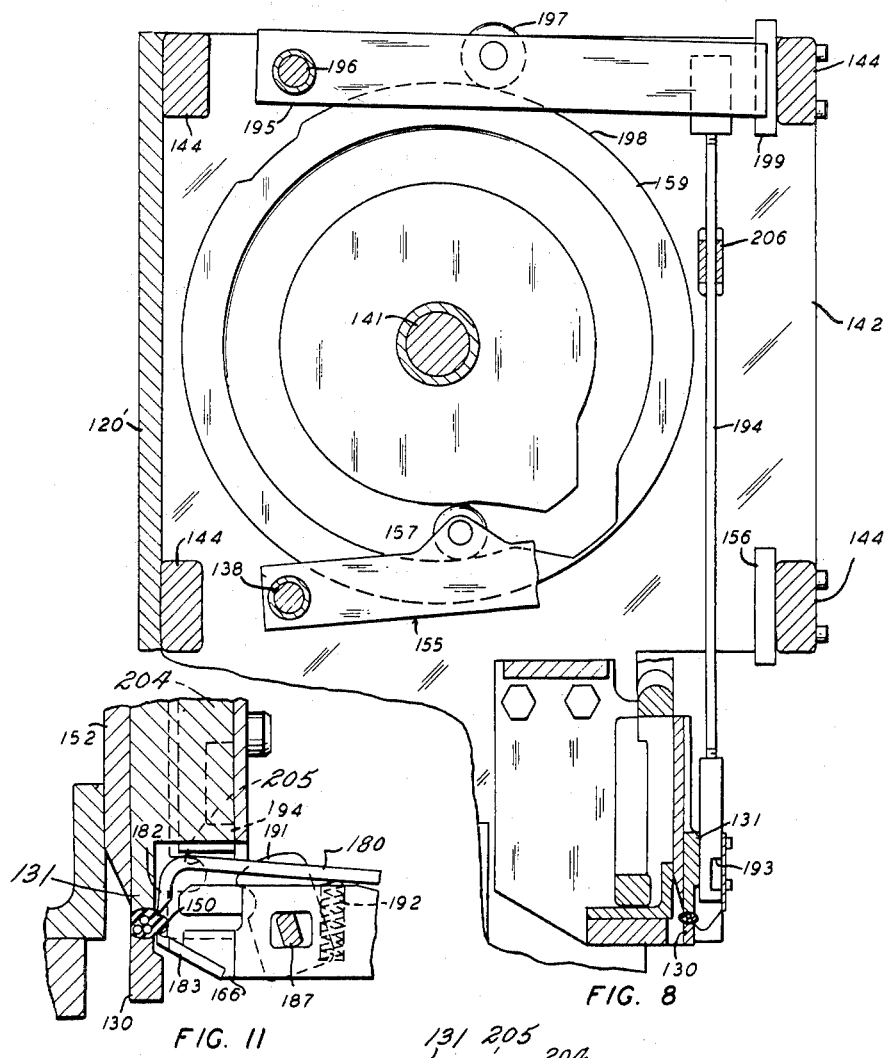
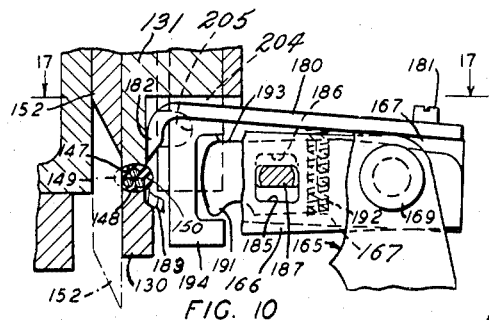
INVENTOR
P. R. POWELL

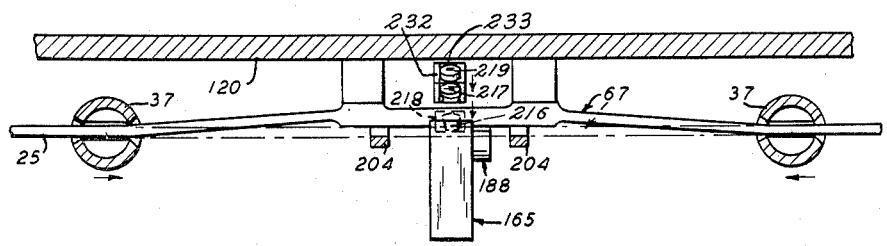
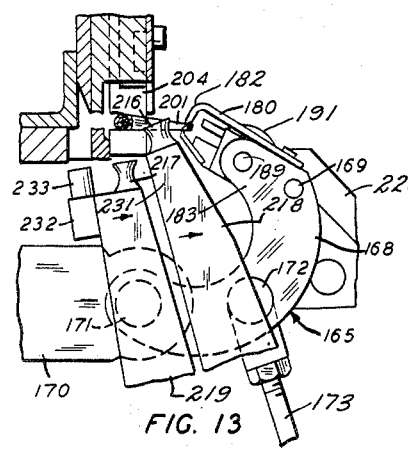
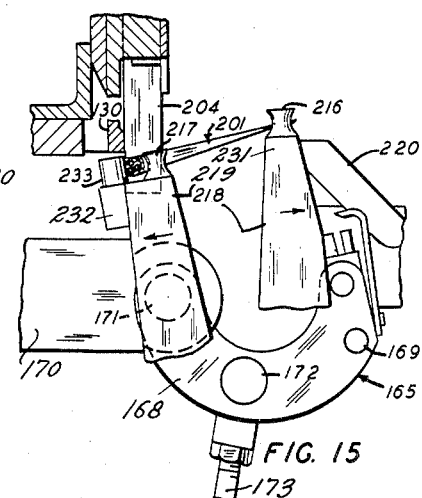
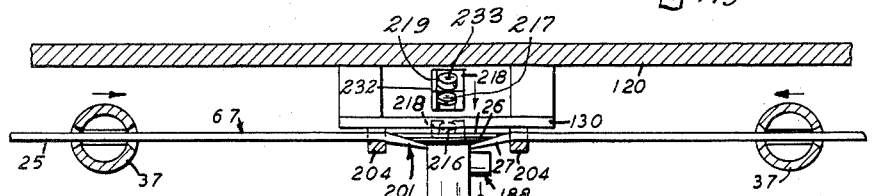
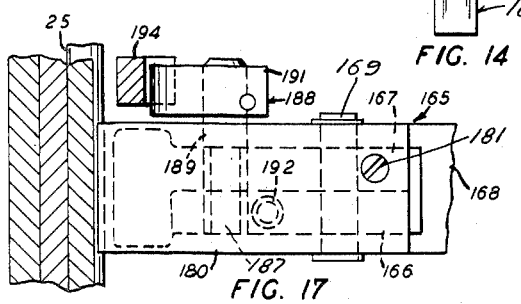

May 1, 1956  P. R. POWELL  2,743,633
APPARATUS FOR REMOVING JACKET SECTIONS
FROM JACKETED ARTICLES
Filed July 17, 1953  9 Sheets-Sheet 9

INVENTOR
P. R. POWELL

United States Patent Office 2,743,633
Patented May 1, 1956

2,743,633

APPARATUS FOR REMOVING JACKET SECTIONS FROM JACKETED ARTICLES

Paul R. Powell, Baltimore, Md., assignor to Western Electric Company, Incorporated, New York, N. Y., a corporation of New York Application July 17, 1953, Serial No. 368,785

15 Claims. (Cl. 81—9.51)

This invention relates to an apparatus for removing sections of the jackets from the cores of elongated jacketed articles, and more particularly to an apparatus for automatically stripping sections of the jacket from jacketed cordage.

Certain types of telephone cords comprise a plurality of individually insulated conductors enclosed in a tough, vulcanized jacket. The end portions of the conductors extend from the jacket and have terminals secured thereto. Such cords are made according to one method from continuous lengths of jacketed cordage by removing sections of the jacket from the cordage at intervals equal substantially to the length of the telephone cords, cutting the exposed sections of the conductors, and applying terminals to the free ends of the conductors.

An object of the present invention is to provide new and improved apparatus for removing sections of the jackets from the cores of elongated jacketed articles.

A further object of the invention is to provide new and improved apparatus for automatically stripping sections of the jacket from jacketed cordage.

An apparatus for stripping the jacket from the core of an elongated jacketed article which illustrates certain features of the invention may include means for weakening a portion of the jacket on one side of the core, means for gripping the opposite side of the weakened portion of the jacket, means for moving the gripping means away from the core to pull the weakened portion of the jacket from the core, means engageable with the article for supporting the cordage against lateral movement during the movement of the gripping means away from the core, stripping elements movable in opposite directions, means for moving the separated portions of the core and the jacket into the paths of movement of the stripping elements, and means for actuating the stripping elements to continue the stripping of the jacket from additional portions of the core.

One specific apparatus embodying the invention is provided with mechanisms for receiving the incoming portion of a continuously moving cordage and continuously advancing the outgoing portion thereof, for alternately accumulating and feeding out the portion of the cordage intermediate the incoming and outgoing portions thereof to intermittently advance the intermediate portion thereof, for clamping the intermediate portion of said cordage at spaced points to support a section thereof from which the jacket is to be removed, for compressing a portion of said section of cordage to form bulges in the jacket on opposite sides of the core, for cutting off one of the bulged portions from the jacket to weaken the jacket on one side, for gripping the other bulged portion and moving the jacket to separate the weakened portion thereof from the core while supporting the cordage adjacent to the ends of the weakened portion of the jacket, for moving the separated portion of the jacket and the core into the path of movement of a pair of stripping elements, for actuating the stripping elements to strip the jacket from the core along the entire length of said section of cordage, and for cutting the jacket at the ends of said section to sever the section of the jacket from the core.

Other objects and advantages of the invention will become apparent by reference to the following detailed description and the accompanying drawings illustrating a preferred embodiment thereof. In the drawings, Fig. 1 is a front elevation of the apparatus, with a housing and a wall shown in section;

Fig. 2 is an enlarged elevation of a piece of cordage of the type which may be processed in the present apparatus;

Fig. 6 is an enlarged, fragmentary, vertical section taken along line 6—6 of Fig. 4;

Fig. 7 is an enlarged, fragmentary, vertical section taken along line 7—7 of Fig. 4;

Fig. 8 is an enlarged, fragmentary, vertical section taken along line 8—8 of Fig. 4;

Fig. 9 is an enlarged, fragmentary section showing some of the elements seen in Fig. 7 with the moving elements in other positions;

Fig. 10 is an enlarged, fragmentary section showing some of the elements seen in Fig. 8 with some of the moving elements in other positions;

Fig. 11 is a view similar to Fig. 10 but with some of the moving elements in still other positions;

Fig. 12 is a partially schematic, horizontal section showing the relative positions of certain elements of the apparatus at one stage of the operation thereof;

Fig. 13 is an enlarged view similar to Fig. 10 but with some of the moving elements in other positions;

Fig. 14 is a view similar to Fig. 12 with elements of the apparatus in different positions;

Fig. 15 is an enlarged view similar to Fig. 10 but with some of the moving elements in still other positions;

Fig. 17 is a fragmentary, horizontal section taken along line 17—17 of Fig. 10;

Fig. 20 is a fragmentary, vertical section taken along line 20—20 of Fig. 19;

Fig. 22 is an enlarged, horizontal section taken along line 22—22 of Fig. 20.

Figure 3:
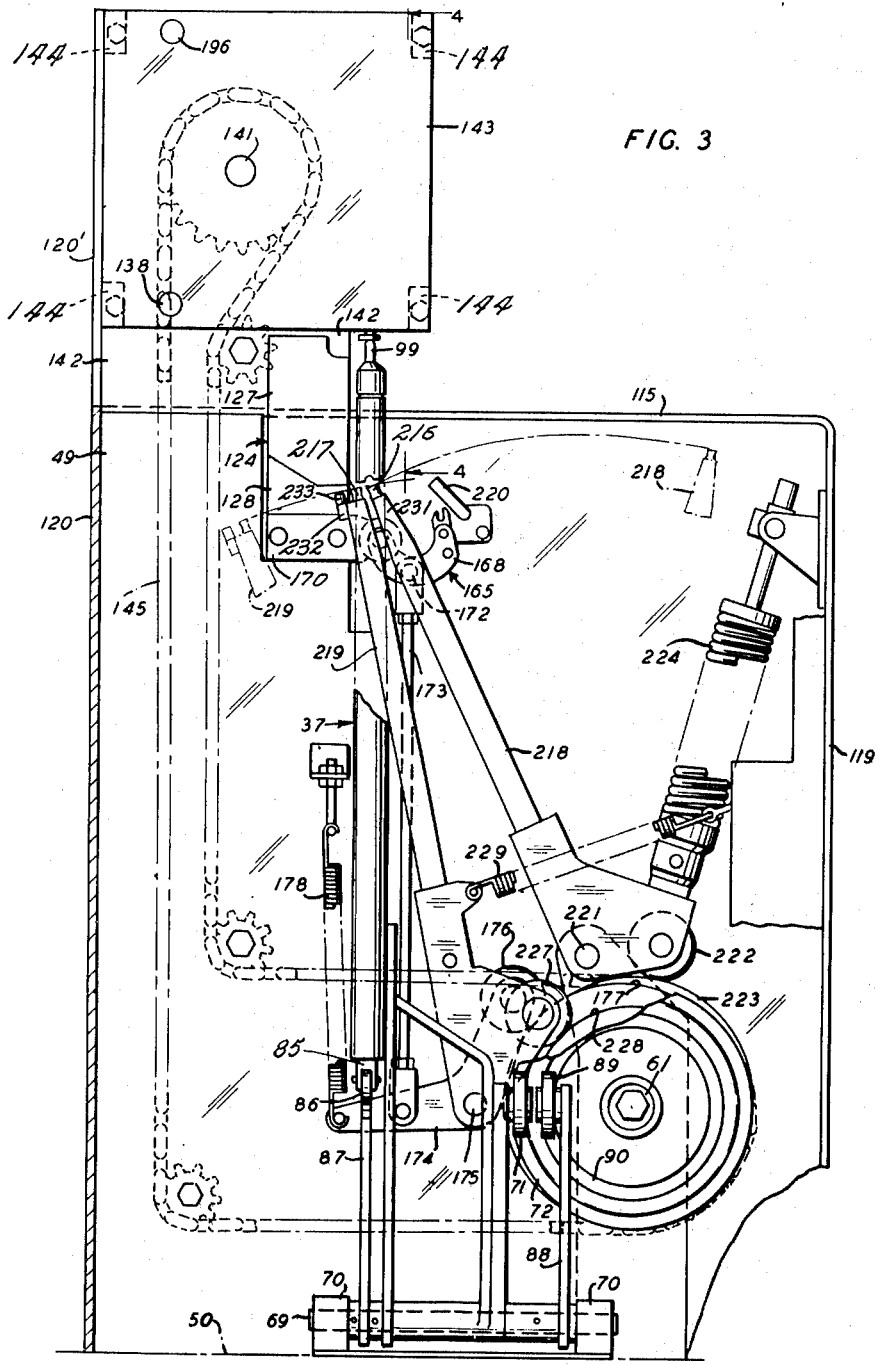
Fig. 3 is a vertical section taken along line 3—3 of Fig. 1.

Referring to the drawings, the apparatus shown therein is designed to work upon cordage 25 (Fig. 2) comprising a core 26 formed of a plurality of individually insulated conductors and a vulcanized or neoprene jacket 27 surrounding the core. The apparatus advances a continuous length of the cordage and strips sections of predetermined length of the jacket from the core at predetermined uniformly spaced intervals therealong. The cordage 25, which is moving continuously as it enters the apparatus (Fig. 1), is guided over a pulley 30 and is looped several times around a stationary pulley 31 and a movable pulley 32, each having a plurality of annular grooves therein. The cordage 25 continues around a stationary pulley 33, from which it is directed upwardly and then horizontally around a pair of pulleys 35 and 36 mounted on a pair of movable arms 37, and through guide slots 39 in the arms 37. As it advances from the pulley 36, the cordage is directly downwardly around a stationary pulley 40 and is looped several times around a stationary pulley 41 and a movable pulley 42, after which the cordage 25 is directed upwardly and is looped several times around driven capstans 44 and 45. The capstans 44 and 45 impart movement to the cordage, which is then directed outwardly from the apparatus and may be wound on a takeup reel (not shown).

The movable pulleys 32 and 42 are rotatably mounted on opposite ends of a walking beam 47 pivotally supported intermediate its ends on a bracket 48 fixed to a vertical, intermediate wall 49 extending upwardly from a base 50. The beam 47 is connected by a link 51 to one end of a lever 52, which is pivotally connected at its other end to a stationary bracket 53 and carries a cam follower 55 thereon intermediate its ends. The cam follower 55 cooperates with a continuously rotating cam 56 mounted on a shaft 57, which is suitably journalled in brackets mounted on the base 50. The shaft 57 is driven through a pair of bevel gears 60 from a main drive shaft 61, which in turn is driven from a motor 62 through a suitable speed reducing unit 63. A chain and sprocket drive 64, interconnecting the shaft 57 and the capstans 44 and 45, serves to drive the capstans for continuously advancing the cord through and discharging it from the apparatus. A spring 66 connected to the walking beam 47 serves to keep the cam follower 55 in contact with the cam 56 to oscillate the beam.

The cam 56 is shaped to oscillate the beam 47 and the movable pulleys 32 and 42 through predetermined cycles of movement. As the beam 47 turns in a clockwise direction, the pulleys 32 and 42 function in cooperation with the stationary pulleys 31 and 41 to accumulate a supply of the continuously incoming cordage on the cooperating pulleys 31 and 32 while a horizontal section 67 of cordage extending between the arms 37 is gripped and held stationary, and simultaneously to dispense the cordage previously accumulated on the pair of cooperating pulleys 41 and 42. During the interval that the cordage 25 is advanced relative to the arms 37, the walking beam is turned in a counterclockwise direction and the pulleys 32 and 42 are moved to permit the re-accumulation of the supply of cordage on the pair of pulleys 41 and 42 and to permit the feeding out of the accumulated supply of cordage on the pair of cooperating pulleys 31 and 32.

Thus, the cordage feed functions to hold stationary an intermediate portion of the continuously advancing cordage while a portion of the jacket is being removed from the horizontal section 67 thereof. Upon completion of the removal of the jacket from that section of cordage, the feed serves to advance the cordage a predetermined distance to locate in operative position the next section 67 of the cordage from which the jacket is to be stripped. A feed mechanism of the walking beam type for receiving a continuously moving supply of cordage and for intermittently advancing an intermediate portion thereof is disclosed and claimed in Patents 2,649,822 and 2,649,867, both granted August 25, 1953.

The cordage supporting arms 37 (Figs. 1 and 3) are supported on shafts 69 for pivotal movement thereon, and the shafts 69 are mounted for oscillatable movement in bearing brackets 70 fixed to the base 50. Cam followers 71 on the arms 37 engage annular cams 72 secured to the main drive shaft 61 and are actuated thereby to rock the arms away from and towards each other in response to the rotation of the cams. Pivotally connected to the arms 37 are the ends of piston rods 73 (Fig. 1), slidably mounted in cylinders of dashpots 74, which in turn are mounted for pivotal movement about fixed pins 75. Compression springs 76 interposed between the heads of the dashpots and collars 77 on the piston rods 73 stress the arms 37 toward each other.

As best seen in Figs. 19 to 22, the upper portion of each of the arms 37 comprises a tubular member 80 in the opposite walls of which the slots 39 are formed. A stationary clamping member 81 (Fig. 20) having a flat lower surface with a groove 82 formed therein is fixed in each of the tubular members 80 with the groove 82 aligned with the upper end of the adjacent slot 39. Slidably mounted in each of the tubular members 80 is a movable clamping member 83, which has at its upper end a flat surface and a transversely extending groove 84 in alignment with the groove 82. A rod 85 is secured to each clamping member 83, and at its lower end the rod 85 has a cam follower 86 secured thereto (Fig. 3), which cooperates with a cam member 87 in the form of an arm extending upwardly from and fixed to its adjacent shaft 69 on one side of its respective arm 37. Fixed to the shafts 69 on the opposite side of the arms 37 are levers 88 carrying cam followers 89, which cooperate with annular cams 90 for actuating the levers 88 and the cam members 87 in one direction. A spring 91 having its ends connected to the levers 88 serves to move the levers 88 and the cam members 87 in the opposite direction.

The cordage 25 extending substantially in a straight line between the pulleys 35 and 36 on the arms 37 is movable vertically in the aligned vertically disposed slots 39 in the tubular portion 80 of the arms and is supported at the bottom of the slots 39 when the movable clamping members 83 are in their lower positions. In response to the actuation by the cam members 87 (Fig. 3), the clamping members 83 are moved upwardly, and the upper portion of the members 83 and the lower portions of the stationary clamping members 81 form pairs of cooperable jaws to engage and clamp substantially the entire circumferential surfaces of the portions of the cordage disposed therebetween for supporting between the arms 37 a section 67 of cordage from which the jacket 27 is to be stripped.

In the upper end of each of the tubular members 80, above the members 81, a plunger 95 (Figs. 19, 20 and 22) is mounted for axial movement and is urged upwardly therein by a spring 96. The plunger 95 is held against rotation by a key 97 (Fig. 20) slidably engageable in a keyway in the plunger. The plunger 95 has a reduced upper end portion 99 extending through an aperture in a cap 100, which is threaded onto the upper end of the tubular member 80 and serves to limit the upward movement of the plunger 95. A pivot pin 101 is carried by the plunger 95, and affixed to the pin 101 is the upper end of a cutter 102 in the form of a thin elongated blade. The pin 101 supports the cutter 102 for vertical movement with the plunger 95 and for pivotal movement relative thereto.

Figures 5, 19, 21:
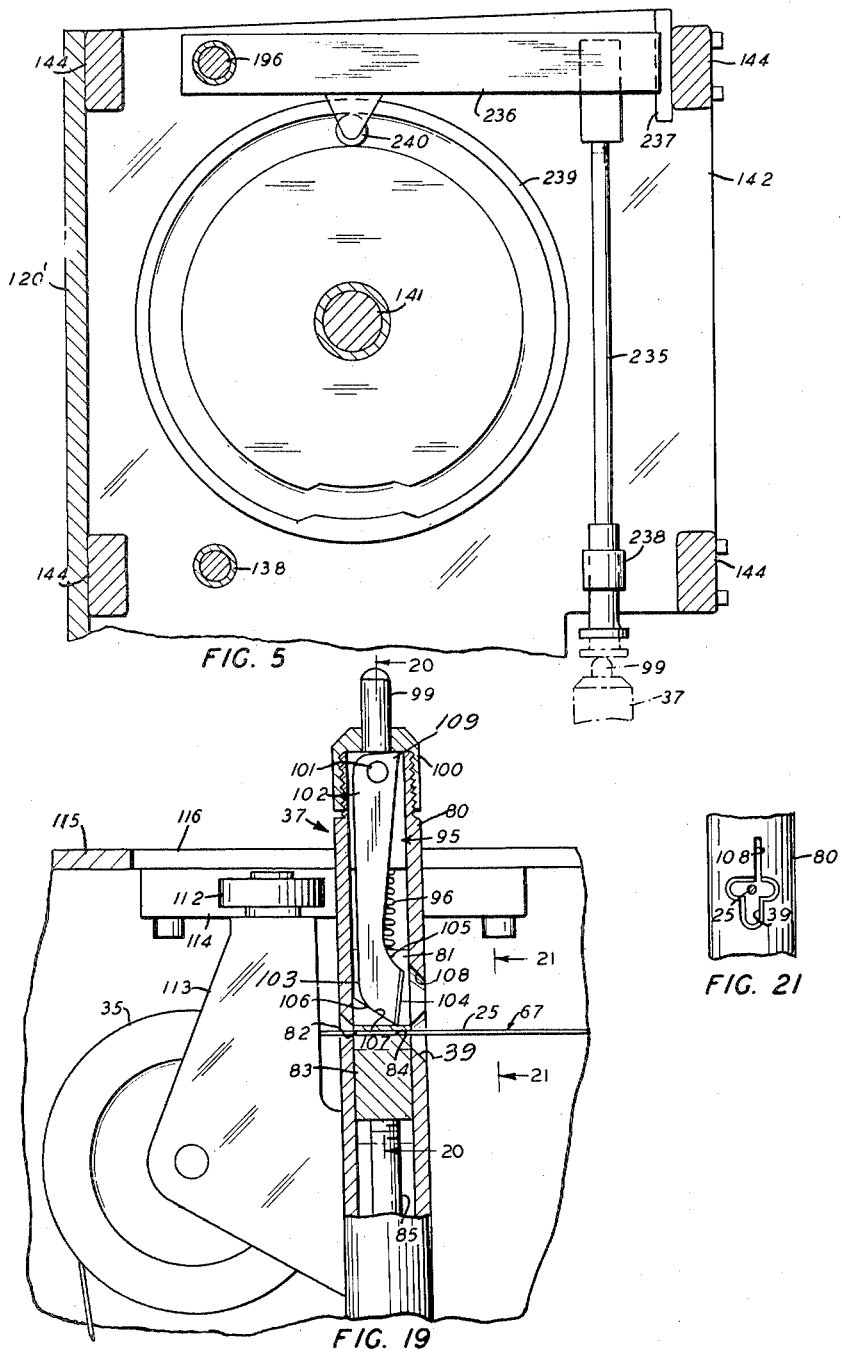
Fig. 5 is an enlarged, fragmentary, vertical section taken along line 5—5 of Fig. 4.
Fig. 19 is an enlarged, fragmentary view of a portion of the apparatus shown in Fig. 1 with parts broken away.
Fig. 21 is an enlarged, fragmentary, vertical section taken along line 21—21 of Fig. 19.

Each cutter 102 is shaped to provide a lower laterally extending portion 103 (Fig. 19) having a substantially vertically disposed sharp cutting edge 104 thereon and a pair of inclined edge surfaces 105 and 106. The lower inclined surface 106 of the cutter 102 engages an oblique cam surface 107 formed on the stationary clamping member 81 for camming the lower end of the cutter outwardly through a slot 108 in the tubular member 80, in response to the downward movement of the plunger 95. As the plunger 95 moves upwardly from its lower position, the cutter 102 returns by gravity to its retracted position as shown in Fig. 19. In the event that resistance to the return movement of the cutter 102 is encountered, the inclined surface 105 on the cutter engages the inclined upper end of the slot 108 to cam the cutter inwardly to its retracted position. When the plunger 95 is in its uppermost position, a corner portion 109 at the upper portion of the cutter 102 engages the cap 100 to retain the cutter in its retracted position.

In their movement toward and away from each other the upper ends of the cordage supporting arms 37 are guided by rollers 112 (Figs. 1 and 19) rotatably mounted on brackets 113, which are secured to the upper ends of the arms 37 and which also rotatably support the pulleys 35 and 36. The rollers 112 have a diameter substantially larger than the diameter of the tubular portion 80 of the arms 37, and ride in guideways formed between guide rails 114 (Fig. 1) fixed to the underneath side of a cover plate 115. The plate 115 forms part of a housing enclosing the major portion of the mechanism. Slots 116 are provided in the plate 115 through which the upper ends of the arms 37 extend.

In addition to the cover plate 115, the housing includes end walls 117 and 118, respectively (Fig. 1), and front and rear walls 119 and 120, respectively (Fig. 3). These walls are secured to and extend upwardly from the base 50, and constitute portions of the supporting framework of the apparatus. Other suitable frame members are provided for supporting various elements of the apparatus, including the intermediate wall 49 (Figs. 1, 3 and 4) extending upwardly from the base 50 and forwardly from the rear wall 120.

Secured to the wall 49 at substantially the elevation of the plate 115 is a rectangular supporting bracket 124 (Figs. 3, 4, 6 and 7) comprising a pair of parallel horizontally disposed members 125 and 126, and a pair of vertical members 127 and 128. The member 128 is longer than the member 127 and is suitably secured to a wall 142. A bar 130 (Figs. 4, 6 and 7) is secured adjacent to its ends to the horizontal frame member 126, which is generally U-shaped to provide a space behind the intermediate portion of the bar 130 and the member 126. The bar 130 is located in the apparatus adjacent to the horizontal section 67 of cordage, and forms a stationary compressing member on which a portion of the section 67 of cordage may be compressed.

A movable compressing member 131 (Figs. 4 and 6) has U-shaped guideways 132 mounted for vertical reciprocation along guides 133 on the supporting bracket 124. At its upper end the slide 132 is pivotally connected by links 134 to the adjacent ends of a pair of parallel bar levers 135. Each of the levers 135 is made of two parallel bars 136 (Fig. 4) joined to their front ends by a pin 137, which engages the link 134, and pivotally mounted at their other ends on a shaft 138. The levers 135 have cam followers 139 positioned between the bars 136 and engageable with cams 140 fixed to a cam shaft 141. The cam shaft 141 is supported for rotation in a vertical plate 142 secured to the frame member 49, and in a vertical plate 143 (Figs. 1 and 3) secured to a rectangular extension 120¹ projecting upwardly from the rear wall 120 of the housing. Upper and lower tie bars 144 connect the plates 142 and 143. The shaft 141 is driven from the main drive shaft 61 through a chain and sprocket connection 145.

The horizontal section 67 of cordage extends tautly between the arms 37 in a substantially straight line. When it is supported in its lower position in the lower portion of the slots 39 in the arms, the section 67 is positioned to one side of the stationary compressing member 130 and below the upper face thereof, as shown in full lines in Fig. 9. With the upper compressing member 131 in raised position in spaced relation to the stationary member 130, the straight section 67 of cordage is moved upwardly by a transfer member, described hereinafter, into engagement with a pair of inclined guide surfaces 146 on the compressing member 131 (Fig. 9). This portion of the cordage is deflected laterally by the guide surfaces 146 to a position between the stationary and the movable compressing members 130 and 131, as indicated in dotted lines in Fig. 9. The compressing members 130 and 131 have curved opposed surfaces 147 and 148 thereon for compressing a predetermined longitudinal portion of the section 67 of the cordage therebetween to cause the rubber jacket thereon to protrude laterally from between the compressing members and form bulges 149 and 150 (Figs. 10 and 11) in the jacket on opposite sides of the core 26.

Figure 4:
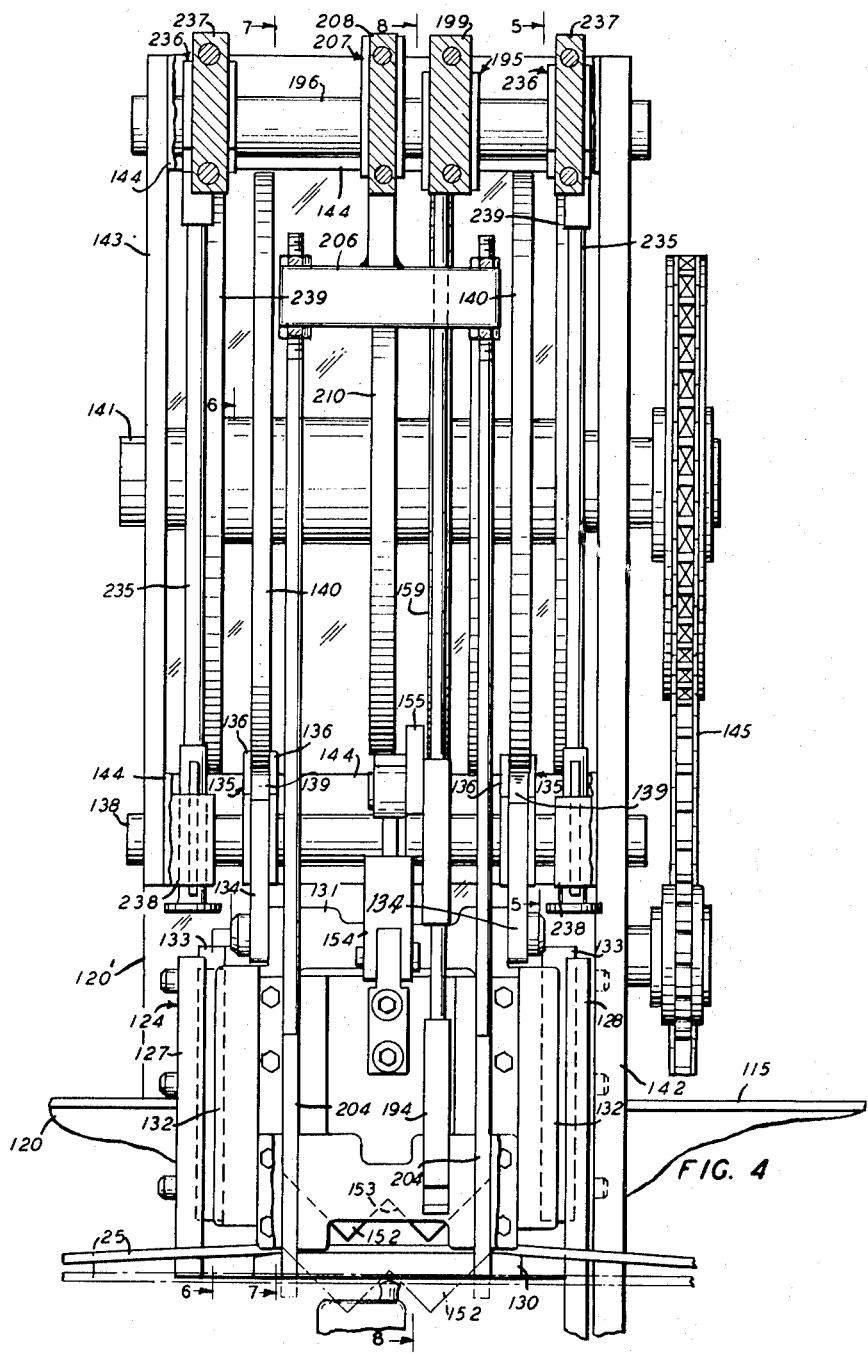
Fig. 4 is a fragmentary, vertical section taken along line 4—4 of Fig. 3.

There is provided a cutter in the form of a flat knife 152 (Figs. 4, 7 and 10) having a sharp lower edge 153 shaped like a W, as viewed from the front (Fig. 4). The knife 152 is mounted for vertical reciprocation and for cooperation with the stationary compressing member 130 to slit or shear off the bulged portion 149 of the jacket 27. The knife 152 is reciprocable vertically in guideways formed in the slide 131, and is connected through a link 154 (Fig. 7) to the side of and near one end of a lever 155. At its other end the lever 155 is pivotally supported on the shaft 138, and is guided by guides 156 secured to the lower tie bar 144 on each side of the outer end of the lever. The lever 155 has a cam follower 157 projecting laterally therefrom which rides in a cam groove 158 in a cam disk 159 fixed to the cam shaft 141. The knife 152 as it moves downwardly cuts the bulged portion 149 of the jacket 27 to weaken the jacket 27 on one side thereof along a predetermined distance longitudinally of said section 67 to permit the weakened portion of the jacket 27 to be readily separated from the core.

A gripper head 165 (Figs. 3, 6, 10, 11, 12, 13, 15, 16, 17 and 19) is provided for gripping the bulged portion 150 of the jacket and for moving it laterally to separate the weakened portion of the jacket from the core 26 and form a loop in the cordage. The gripper head 165 comprises a pair of fingers 166 and 167 (Fig. 17) mounted in the bifurcated end of a curved arm 168 for oscillatable movement about a pin 169. At its other end the arm 168 is pivotally supported on a bracket 170 for pivotal movement about a fixed pin 171. The bracket 170 is secured to the member 128 of the rectangular bracket 124. Intermediate its ends the arm 168 is pivotally connected at 172 to one end of a rod 173 (Fig. 3), which, at its lower end, is connected to one arm of a bell crank 174 mounted for oscillation about a stationary pivot 175 mounted on the wall 49 and having a cam follower 176 on its other arm. The cam follower 176 coperates with a cam 177 (Figs. 1 and 3) fixed to the main drive shaft 61, and the cam 177 in cooperation with a spring 178 connected to the bell crank 174 serves to effect the oscillation of the gripper head to and from an advanced or operative position (Fig. 10) to a retracted or inoperative position (Fig. 3).

As shown particularly in Figs. 10 and 17, a flat slightly flexible member 180 is secured at one end thereof to the finger 167 by a screw 181 to yieldably support the other end of the member 180 for limited movement relative to the member 167. The other end of the member 180 is bent downwardly and is provided with a beveled end to form a gripping jaw 182, which is adapted to cooperate with the end of a gripping jaw 183 formed on the end of the finger 166 to bite into the uncut bulged portion 150 of the jacket 27 to firmly grip the jacket therebetween (Fig. 11). The fingers 166 and 167 are provided with rectangular apertures 185 and 186 in which is positioned a rectangular cam portion 187 of an actuating member 188 for moving the fingers 166 and 167 and the jaws 182 and 183 thereon to and from open and closed positions.

The actuating member 188 has cylindrical bearing portions 189 (Fig. 17) journalled in bearing apertures in the bifurcated end of the arm 168 for supporting the actuating member for oscillation. The actuating member 188 has a trip lever 191 secured thereto, by means of which the actuating member may be oscillated through approximately 90° to cause the movement of the jaws 182 and 183 to and from their open and closed positions. A spring 192 (Figs. 10 and 11) mounted in a recess of the finger 166 and reacting against the flat member 180 stresses the fingers 166 and 167 for movement to separate them and maintain them in engagement with the rectangular cam portion 187 of the actuating member 188. The spring 192 and the actuating member 188 cooperate to hold the members 166 and 167 and the jaws 182 and 183 in either open or closed positions.

From its retracted inoperative position with the gripping jaws 182 and 183 open (Fig. 3), the gripper head 165 is designed to be moved into its advanced operative position (Fig. 10) to position the jaws 182 and 183 in close proximity to the compressing members 130 and 131 and on opposite sides of the bulged portion 150 of the jacket 27. The trip lever 191 of the actuating member 188 in this position of the gripper head is disposed horizontally and the end thereof fits into a rectangular notch 193 of a trip rod 194 (Figs. 4, 8, 10 and 17) mounted for reciprocable movement in a guideway in the movable compressing member 131. The trip rod 194 extends upwardly and is connected to a parallel bar lever 195, which is similar to the levers 135. The lever 195 is pivotally mounted on a shaft 196 and has a cam follower 197 cooperable with a cam surface 198 on the cam disk 159. The cam 198 imparts reciprocation to the trip rod 194. The lever 195 is guided by a guide 199 to maintain the cam follower 197 in contact with the cam surface 198.

In response to its upward movement when the end of the trip lever 191 is in engagement in the notch 193 thereof, the trip rod 194 oscillates the actuating member 188 through approximately 90° to move the gripping jaws 182 and 183 together to their closed position (Fig. 11) to grip the bulged portion 150 of the jacket therebetween. When the bulged portion 150 of the jacket has been gripped between the jaws 182 and 183, and after the compressing member 131 has been raised, the arm 168 is actuated to retract the gripper head 165 to an intermediate position (Figs. 13 and 14). Since the jacket 27 has previously been weakened by the severance of the bulge 149, this movement separates the weakened portion of the jacket 27 from the core 26 and forms a lop 201 in the cordage.

To facilitate the complete separation of the jacket 27 from the core 26, a pair of cordage holding and transfer members 204 are provided (Figs. 4 and 7). The transfer members 204, which are in the form of rectangular bars, are mounted for vertical movement in guideways in the movable compressing member 131 and are provided with notches 205 adjacent to their lower ends. The transfer members 204 are spaced apart horizontally in substantial alignment with the sides of the knife 152, and are connected by a rod 205 to a T-shaped connector member 206, which is pivotally connected to one end of a parallel bar lever 207 similar to the levers 135. The other end of the lever 207 is pivotally supported on the shaft 196, and it is guided by a guide 208. A cam follower 209 on the lever 207 cooperates with a cam 210 secured on the cam shaft 141. The cam 210 serves to oscillate the lever 207 and to reciprocate the transfer members 204.

The lower ends of transfer members 204 are normally disposed above the level of the section 67 of cordage 25. After said section of cordage has been moved laterally into position between the compressing members 130 and 131, and during the compression of the cordage therebetween, the transfer members 204 are lowered to align the notches 205 therein horizontally with the adjacent portions of the cordage 25. After the knife 122 has been actuated to cut the bulged portion 149 of the jacket 27 and the upper compressing member 131 has been raised, and as the gripper head 165 is moved laterally from its advanced operative position, the section 67 of cordage is moved laterally with the gripper head from between the compressing members 130 and 131 into the notches 205 in the transfer members. The notches 205 serve to position the section 67 of cordage to one side of and adjacent to the stationary compressing member 130, and to hold the section of cordage against further lateral movement during the separation of the weakened portion of the jacket from the core (Fig. 9).

After the gripper head has moved to an intermediate position shown in Fig. 14 and the weakened portion of the jacket has been separated from the core 26 to form the loop 201 in the section 67 of cordage, the transfer members 204 are moved further downwardly to carry the loop 201 over a pair of stripping rollers 216 and 217 (Figs. 3, 15 and 16) supported on the upper ends of a pair of stripping levers 218 and 219, respectively. As the gripper head 165 continues its movement to the inoperative position (Fig. 15), the trip lever 191 engages a stationary trip member 220 (Fig. 13) mounted in the path of movement thereof, and the lever 191 and the actuating member 188 are oscillated thereby through approximately 90° to open the gripping jaws 182 and 183 and to release the separated portion of the jacket 27.

The stripping lever 218 (Figs. 1 and 3) is in the form of a bell crank, and is mounted on a stationary pivot support 221 connected to the wall 49. The lever 218 has a cam follower 222 riding on a cam 223 fixed to the main drive shaft 61. A compression spring 224 is operatively connected to the lever 218 and cooperates with the cam 223 to effect oscillation of the lever 218 and of the stripping element 216 carried thereby. The stripping lever 219 is mounted for oscillation on the pivot support 175, and has a cam follower 227 riding on a cam 228 secured to the drive shaft 61. The cam 228, in cooperation with a spring 229 connected to the lever 219, serves to oscillate the lever 219 and the stripping element 217 thereon through a predetermined distance.

The stripping rollers 216 and 217 have concave peripheries, and are supported on laterally projecting end portions 231 and 232 of the levers 218 and 219, respectively, (Figs. 3, 13 and 15) in a position to engage the jacket and the conductors at a point substantially midway of the longitudinally cut and weakened portion of the section 67 of the cordage. A second roller 233 is mounted on the upper end 232 of the lever 219 in spaced relation to the roller 217, and the roller 233 in cooperation with the end portion 232 of the lever 219 and the roller 217, forms a notched support on the stripping lever 219 for receiving the core 26 therein in response to the downward movement of the loop 201 of cordage by the transfer members 204, as stated above.

Figure 16:
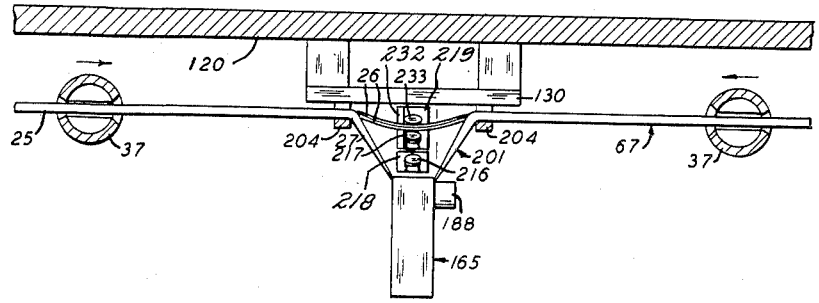
Fig. 16 is a view similar to Fig. 12 with elements of the apparatus in still other positions.

The stripping levers 218 and 219 are moved to the position shown in Fig. 3 during a portion of the cycle of operation to permit the gripper head 165 to be actuated to and from its advanced operative position. As the gripper head moves from its advanced operative position to the intermediate position (Fig. 14), the stripping rollers 216 and 217 are moved into a predetermined position relative to the loop 201 in the cordage (Fig. 16). The transfer members 204 are then actuated to lower the loop 201 over the stripping rollers 216 and 217 and to position the separated portion of the jacket and the core in the path of movement of the stripping rollers.

Figure 18:
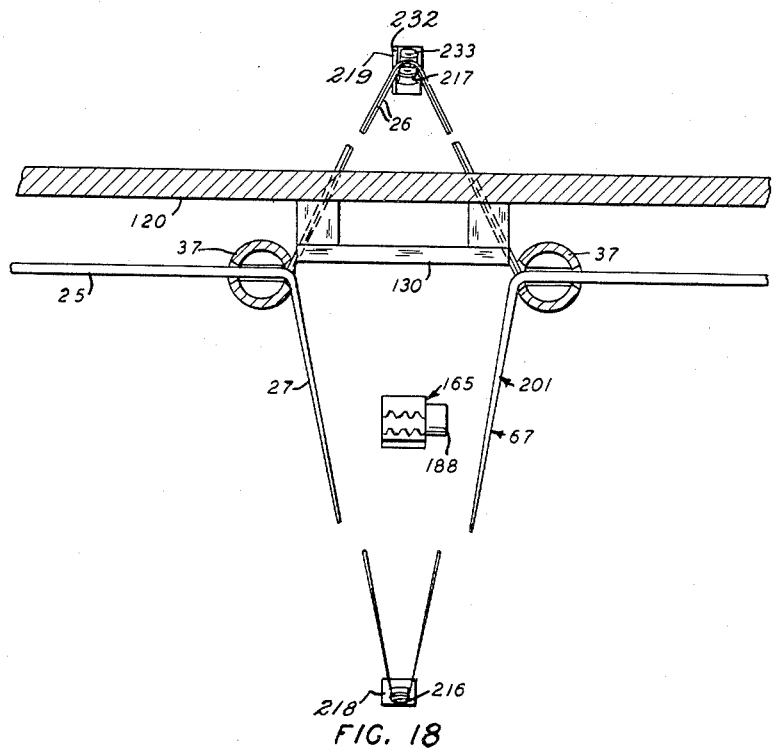
Fig. 18 is a view similar to Fig. 12 with elements of the apparatus in still other positions.

As the gripper head 165 continues its movement to its retracted inoperative position (Fig. 15) and is out of the path of movement of the end portion 231 of the stripping member 218, the gripping jaws 182 and 183 are actuated to open position to release the stretched portion of the jacket 27 gripped therebetween and the jacket contracts into engagement with the stripping roller 216. The levers 218 and 219 are then moved in opposite directions away from each other to cause the stripping of the jacket 27 from the core 26 throughout the section 67 of the cordage supported between the arms 37 (Fig. 18). In order to prevent the stretching of the conductors 26 during the stripping operation and while the stripping levers 218 and 219 are being moved in opposite directions relative to each other, the arms 37 are caused to move toward each other to an inner position, as shown in Fig. 18.

Mechanism is provided for actuating the cutters 102 when the cord supporting arms 37 are in the inner position to cause the cutters to cut transversely through the portions of the jacket 27 at points adjacent to the arms 37 for effecting the severance of the stripped section of the jacket from the cordage. With the arms 37 in their inner position (Fig. 18), the ends 99 of the plunger 95 for actuating the cutters 102 are disposed beneath and in vertical alignment with a pair of push rods 235 (Figs. 1, 3, 4 and 5), which are mounted for vertical movement and are connected at their upper ends to levers 236. The levers 236 are oscillatable about the shaft 196, and are guided by guides 237 (Figs. 4 and 5). The push rods 235 are guided in their vertical movements by guides 238. Cams 239 mounted on the cam shaft 141 cooperate with cam followers 240 on the levers 236 to impart reciprocation to the actuating rods 235 in timed relation to the actuation of the other elements.

Thus, during a portion of the cycle of operation of the apparatus, with the arms 37 in their inner position and the stripping levers 218 and 219 in their separated positions, as shown in Fig. 18, the stripped portions of the core 26 and the jacket 27 extend from the arms 37 in diverging relation to each other. At this time the push rods 235 are actuated to depress the plungers 95 (Fig. 19) and thereby cause the cutters 102 to move to their lowermost positions and to cut through the jacket 27 at the ends of the stripped section thereof and thereby sever the stripped section of the jacket from the cordage 25. The cordage supporting arms 37 are then returned to their outer positions, and the cordage clamping plungers 84 are actuated to release the cordage. The cordage 25 is then advanced through a predetermined distance to position between the arms 37 the next succeeding section of cordage from which a section of the jacket is to be removed during the following cycle of operation of the apparatus.

Thus, it will be seen from the above description that the apparatus functions to receive the continuously moving cord as it enters the apparatus, to alternately accumulate and intermittently feed the intermediate portion of the cord, to clamp and support in the pair of cordage supporting arms a section of the cordage from which the jacket is to be stripped, to compress a portion of said section of cordage to form bulges in the jacket on opposite sides of the core, to longitudinally cut one bulged portion of the jacket to weaken the jacket along a predetermined longitudinal portion thereof, to grip the other bulged portion and separate the weakened portion of the jacket from the core, to position the separated portion of the core and jacket in the path of movable stripper rollers which operate to strip the jacket from the core along the length of said section of cordage, and to cut through the stripped portion of the jacket at the ends therof to sever the stripped portion of the jacket from the cordage.

It is to be understood that the above-described arrangements are simply illustrative of the application of the principles of this invention. Other arrangements may be devised by those skilled in the art, which will embody the principles of the invention and fall within the spirit and scope thereof.

What is claimed is:

1. An apparatus for stripping the jacket from the core of an elongated jacketed article, which comprises means for weakening a portion of the jacket on one side of the core, means opposed to the jacket-weakening means for gripping the opposite side of the weakened portion of the jacket, means for moving the gripping means away from the core to pull the weakened portion of the jacket from the core, means adjacent to the gripping means and engageable with the article for preventing lateral movement of the core during the movement of the gripping means away from the core, stripping elements adjacent to the gripping means and movable in opposite directions, means for moving the separated portions of the core and the jacket into the paths of movement of the stripping elements, and means for actuating the stripping elements in opposite directions to continue the stripping of the jacket from additional portions of the core.

2. An apparatus for stripping the jacket from the core of jacketed cordage, which comprises means for clamping the cordage at spaced points to support therebetween a section of the cordage from which the jacket is to be stripped, means intermediate the clamping means for weakening a portion of the jacket on one side thereof, means opposed to the jacket-weakening means for gripping the side of the jacket opposite to the weakened portion thereof, means for effecting relative movement between said clamping means and said gripping means to cause the jacket to be stripped initially from portions of the core adjacent to the weakened portion thereof, transfer means adjacent to the gripping means for preventing lateral movement of the weakened portion of the cordage during said initial stripping of the jacket, a pair of stripping elements adjacent to the gripping means and movable through predetermined paths in opposite directions, means for moving the transfer means to cause the separated portions of the core and the jacket to be positioned in the paths of movement of the stripping elements, and means for actuating the stripping elements to cause the jacket to be stripped from the remainder of the core in said section of the cordage.

3. Apparatus for stripping the jacket from the core of jacketed cordage, which comprises means for supporting a length of such cordage in a substantially straight line, means for cutting away a short portion of the jacket on one side of the cordage in said length to form a weakened section, a head adjacent to the jacket-cutting means and having a pair of gripping members thereon for gripping the jacket on the side opposite said weakened section, an actuator for moving said gripping members to and from open and closed positions, means for moving said head from and to a retracted position and an advanced position in which said gripping elements are adjacent to said cordage at a point opposite said weakened section, means adjacent to said jacket-cutting means and operable when said head is in its advanced position for moving said actuator so as to close the gripping members upon the adjacent portion of the jacket, and means mounted adjacent to the path of movement of said head and engageable by the actuator when said head is moved a predetermined distance away from its advanced position for moving said actuator so as to open said gripping fingers and to release the jacket.

4. In an apparatus for stripping the jacket from the core of jacketed cordage, the combination of means for clamping the cordage at spaced points to support a section of cordage from which the jacket is to be stripped, means intermediate the clamping means for compressing a portion of the cordage to form bulged portions in the jacket on opposite sides of the core, means adjacent to the compressing means for cutting off one of the bulged portions to weaken a predetermined portion of the jacket, means adjacent to the cutting means for gripping the other bulged portion of the jacket and moving it laterally to separate the weakened portion of the jacket from the core, means adjacent to the gripping means and engageable with the cordage adjacent to the weakened portion of the jacket for supporting the cordage against lateral movement durnig the separation of the weakened portion of the jacket from the core, a pair of stripping elements adjacent to the gripping means and movable through predetermined paths in opposite directions, means adjacent to the stripping elements for moving the separated portions of the core and the jacket into the paths of movement of the stripping elements, means for actuating the stripping elements to effect the stripping of the jacket from the core throughout the length of said section of cordage, and means adjacent to said clamping means for severing the ends of the stripped section of the jacket to remove said section of the jacket from the cordage.

5. In an apparatus for stripping the jacket from the core of jacketed cordage, the combination of means for supporting a length of said cordage in a substantially straight line, means for compressing a short portion of said length of cordage to form bulged portions in the jacket on opposite sides of the core, means adjacent to the compressing means for cutting the bulged portion on one side of the core, a head having a pair of gripper fingers thereon for gripping the bulged portion of the jacket on the other side of the core, an actuator on said head for moving said fingers to and from a normally open position and a closed position in response to movement of said actuator to and from a first position and a second position and for holding said fingers in said open and said closed positions, means for moving said head from and to a retracted position and an advanced position in which said fingers are adjacent to the compressed portion of said cordage and are engageable with the other bulged portion of the jacket, means mounted adjacent to the path of movement of said head for moving said actuator to said first position to open said gripping fingers at a predetermined position in the movement of said head from said advanced position, and means adjacent to the compressing means and operable when said head is in said advanced position for moving said actuator to said second position to close the gripping fingers upon said other bulged portion of said jacket.

6. In an apparatus for stripping the jacket from the core of jacketed cordage, the combination of means for supporting said cordage at spaced points, means for intermittently advancing said cordage, clamps on said supporting means for clamping the cordage at spaced points to support therebetween a section of cordage from which the jacket is to be stripped, means intermediate said clamps for cutting the jacket on one side of the core to weaken a predetermined longitudinal portion of the jacket, means adjacent to the cutting means for gripping the jacket on the side opposite to the weakened portion thereof and pulling it to separate the weakened portion of the jacket from the core and to form a loop in said cordage, transfer means adjacent to the gripping means and engageable with the cordage adjacent to the weakened portion of the jacket for supporting the cordage against lateral movement during the separation of the weakened portion of the jacket from the core, a pair of stripping elements movable below the transfer means and into alignment with the loop in the cordage, means for actuating the transfer means to move the looped portion of the cordage over the stripping elements, means for moving the stripping elements relative to each other to effect the stripping of the jacket from the core throughout the length of said section of cordage, and means on said supporting means adjacent to said clamps for severing the ends of the stripped section of the jacket to remove said section of the jacket from the cordage.

7. In an apparatus for stripping the jacket from the core of jacketed cordage, the combination of means for supporting said cordage at spaced points, means for intermittently advancing said cordage between said supports, means on said supporting means for clamping the cordage to support therebetween a section of cordage from which the jacket is to be stripped, means intermediate the clamping means for compressing a portion of the cord to form opposed, bulged portions in the jacket, means adjacent to the compressing means for cutting one of the bulged portions to weaken a predetermined portion of the jacket, means opposite the cutting means for gripping the other bulged portion of the jacket and pulling it laterally to separate the weakened portion of the jacket from the core, a pair of transfer members engageable with the cordage adjacent to the gripping means for limiting the lateral movement of the cordage during the separation of the weakened portion of the jacket from the core, a pair of stripping elements adjacent to the transfer members and movable in opposite directions to and from positions in close proximity to the separated portions of the core and jacket, means for actuating the transfer members to move the separated portions of the core and jacket over the stripping elements and in the paths of movement thereof, means for actuating the stripping elements in opposite directions to effect the stripping of the jacket from the core throughout the remainder of said section of cordage, and means for cutting the ends of the stripped section of the jacket at points adjacent to said clamping means to sever the stripped section of the jacket from the cordage.

8. An apparatus for stripping the jacket from the core of jacketed cordage comprising a pair of arms having apertures therein for supporting said cordage and guiding said cordage for movement therethrough, means for intermittently advancing said cordage, means mounting said arms in spaced relation to each other and for movement toward and away from each other to and from a normal outer position and an inner position, means on said arms for clamping the cordage to support therebetween a section of cordage from which the jacket is to be stripped, means intermediate said clamping means for cutting a portion of the jacket of said section of cordage on one side thereof to weaken said portion of the jacket, means opposite the cutting means for gripping the other side of the weakened portion of the jacket and pulling said jacket laterally to separate that portion of the jacket from the core, a pair of movable stripping elements adjacent to the gripping means for engaging the separated portions of the core and the jacket, means for moving the separated portions of the core and the jacket in the path of movement of said stripping elements, means for actuating said stripping elements to move the core and the jacket in opposite directions to strip the jacket from said core throughout the remainder of said section of cordage, means for moving the cordage supporting arms to said inner position in timed relation with the stripping of said jacket to prevent the stretching of said core, a pair of cutters, means mounting said cutters on said arms for movement therewith and for movement relative to said arms into engagement with the end portions of the stripped section of the jacket to cause the severance of the stripped section of the jacket from said core, and means for actuating said cutters when said cordage supporting arms are in said inner position.

9. An apparatus for stripping the jacket from the core of jacketed cordage comprising a pair of tubular arms having aligned apertures therein for guiding the cordage for movement therethrough, means mounting said tubular arms in spaced relation to each other and for pivotal movement toward and away from each other to and from a normal outer position and an inner position, a pair of clamping members in each of said tubular arms, means for actuating one of said clamping members on each arm to clamp said cordage in said tubular arms to support between said arms a section of cordage from which the jacket is to be stripped, means intermediate said arms for cutting a portion of the jacket of the section of cordage between said arms and on one side of said core, means for gripping the side of the jacket directly opposite to the longitudinally cut portion thereof and pulling said jacket transversely of the cordage to separate a portion of the jacket from the core, a pair of stripping elements adjacent to the gripping means for engaging the separated portions of the core and the jacket, means for moving said stripping elements in opposite directions to strip the jacket from said core throughout the remainder of said section of cordage, means for moving said cordage supporting arms to said inner position in timed relation with the stripping of said jacket to prevent the stretching of said core, plungers slidably mounted in the ends of said arms, cutters mounted on said plungers for movement therewith and having a cutting edge engageable with the jacket adjacent to said arms for severing said jacket in response to the movement of said plunger in one direction, and means operable when said arms are in said inner position for actuating said plungers in said direction.

10. An apparatus for stripping the jacket from the core of jacketed cordage comprising a pair of tubular arms having apertures therein for guiding the cordage for movement along a predetermined path, means mounting said tubular arms in spaced relation to each other and for movement toward and away from each other to and from a normal outer position and an inner position, a pair of relatively movable clamping members in each of said tubular arms, means for actuating said clamping members to clamp said cordage in said tubular arms to support between said arms a section of cordage from which the jacket is to be stripped, means intermediate said arms for cutting longitudinally a small portion of the jacket of said cordage on one side of said core to weaken a predetermined longitudinal portion of said jacket, means for gripping the other side of the weakened portion of the jacket and pulling said jacket to separate the weakened portion of the jacket from the core, a pair of stripping elements adjacent to the jacket gripping and pulling means and movable in opposite directions through predetermined paths, means for moving the separated portions of the core and the jacket into the path of movement of said stripping elements, means for actuating the stripping elements in opposite directions to effect the stripping of the jacket from the core throughout the length of said section of cordage and to position said core and stripped portion of the jacket in diverging relation to each other at said arms, a plunger mounted in the end of each of said arms for movement to and from a normal upper position and a lower position and having a portion thereof extending beyond said arms, spring means for moving said plunger to said upper position, a cutter member pivotally mounted on said plunger for movement therewith and having a cutting edge engageable with the jacket adjacent to said arms for severing said jacket, means on said arms for imparting pivotal movement to said cutting member to an operative position to effect the severing of the jacket adjacent to said arms in response to the movement of said plunger to said lower position, and means for moving said plunger to said lower position when said arms are in said inner position.

11. An apparatus for stripping the jacket from the core of jacketed cordage comprising means for receiving continuously moving cordage and continuously discharging said cordage including means for intermittently advancing through predetermined distances the portion of the cordage intermediate the continuously moving incoming and outgoing portions thereof, a pair of cordage supporting arms having means thereon for supporting and guiding therebetween a section of said intermittently movable cordage from which the jacket is to be stripped, clamping means on said arms operable to clamp the ends of such a section of said cordage, a pair of opposed compressing members disposed between said arms for compressing a portion of cordage supported by said arms to form bulged portions in said jacket on opposite sides of said core, means adjacent to the compressing members for cutting the bulged portion on one side of said core to weaken a portion of the jacket, means opposite the cutting means for gripping the bulged portion of the jacket on the other side of said core and for pulling said jacket transversely of said cordage to separate the weakened portion of the jacket from the core and to form a loop in said section of cordage, transfer means for supporting the section of cordage adjacent to the weakened portion of the jacket against transverse movement during the separation of the weakened portion of the jacket from the core, a pair of stripping elements adjacent to the transfer means, means for actuating said transfer means to move the cordage and position the loop therein around the stripping elements, means for moving said stripping elements in opposite directions to strip the jacket from said core throughout the remainder of said section of cordage, cutters mounted on said cordage supporting arms for movement therewith and for movement relative thereto in a predetermined direction for engagement with the end portions of the stripped section of the jacket for severing said section of the jacket from the cordage, and means for actuating said cutters when said stripping action is completed.

12. In an apparatus for stripping the jacket from the core of jacketed cordage, the combination of means for clamping the cordage at a pair of spaced points for supporting therebetween a section of the cordage from which the jacket is to be stripped, a stationary compressing member disposed intermediate said gripping means for supporting a portion of said section of cordage thereon, means including a movable compressing member operable to compress the cordage against said stationary member to form bulged portions in the jacket on opposite sides of the core, means at one side of said compressing members for cutting one of the bulged portions of the jacket, a gripping head at the other side of said compressing members having a pair of fingers pivotally mounted thereon, one of said fingers having a portion thereof forming a first gripping jaw, an element having a portion forming a second gripping jaw, means yieldably mounting said element on said other finger for movement therewith, said jaws being movable on said head from an open position to a closed position for gripping the other bulged portion of said jacket therebetween, an actuating member on said head for moving said fingers and the jaws thereon to and from open and closed positions in response to movement of said actuating member to and from first and second positions and for holding said fingers in said positions, means mounting said head for movement to and from an advanced position in close proximity to said stationary compressing member and the cordage thereon, means operable when said head is in said advanced position for moving said actuating member to said second position to effect the gripping of the uncut bulged portion of said jacket by said gripping jaws, means for moving said head to and from said advanced position and a retracted position for pulling the cut portion of the jacket from the core, and means for moving said actuating member to said first position to open said gripping jaws and release said jacket in response to the traverse of said head to a predetermined position during its movement from said operative position.

13. In an apparatus for stripping the jacket from the core of jacketed cordage, the combination of means for holding the cordage at a pair of spaced points thereon for supporting therebetween a section of the cordage from which the jacket is to be stripped, a stationary compressing member intermediate said points for supporting a predetermined portion of said section of cordage thereon, means including a movable, opposed compressing member operable to compress the cordage against said stationary compressing member to form two opposed bulged portions in the jacket, means positioned at one side of the compressing members and including a cutter for cutting off one of the bulged portions of the jacket, a pair of stripping elements positioned adjacent to said compressing members and movable through predetermined paths to and from a position adjacent to said stationary compressing member, a gripping head positioned at the opposite side of said compressing members and having a pair of fingers mounted thereon for movement to and from open and closed positions and operable in said closed position to grip the uncut bulged portion of the jacket, an actuating member on said head for moving said fingers to and from open and closed positions and for holding said fingers in said positions in response to movement of said actuating member to and from first and second positions, means mounting said head for movement to and from an advanced position in close proximity to the stationary compressing member and the cordage thereon, means operable when said head is in said advanced position for moving said actuating member to said second position to effect the gripping of said uncut bulged portion of said jacket by said fingers, means for moving said head to and from said advanced position and a retracted position for separating the cut portion of the jacket of said cordage from the core thereof and to position the separated portion of the jacket in the path of movement of one of said stripping elements, means for moving the stripped portion of the core in the path of movement of the other stripping element, means for moving said stripping elements to effect the stripping of the remainder of the jacket from the core of said section of cordage, and means for moving said actuating member to said first position to open said gripping fingers and release said jacket.

14. An apparatus for stripping the jacket from a core of jacketed cordage, which comprises cordage supporting means including a pair of arms mounted in spaced relation to each other for pivotal movement toward and away from each other to and from normal outer positions and inner positions for supporting the cordage for intermittent movement along a substantially straight horizontal line and for limited vertical movement, means for intermittently advancing said cordage, means on said arms for moving said cordage vertically from a normal lower position to an upper position, means on said arms for gripping said cordage to support therebetween a section of said cordage from which the jacket is to be stripped, a stationary compressing member disposed between said arms and to one side of the section of cordage extending therebetween, a movable compressing member disposed above said stationary compressing member, means adjacent to the compressing members for directing said cordage laterally into a position between said compressing members in response to movement of the cordage from said lower position to said upper position on said arms, means for actuating said movable compressing member to compress a portion of the cordage to form bulged portions in the jacket on opposite sides of the core, a cutter at one side of the stationary compressing member for cutting the bulged portion on one side of said core to weaken a longitudinal portion of the jacket, means for actuating said cutter, gripping means at the opposite side of the stationary compressing member for engaging the other bulged portion of the jacket, means for actuating said griping means to grip said other bulged portion and to pull the weakened portion of the jacket to separate it from said core and to form a loop in said cordage, a pair of transfer members disposed adjacent to said stationary compressing member and operable for engaging the cordage adjacent to the ends of the weakened portions of the jacket and for limiting the lateral movement of said section of cordage during the separation of the weakened portion of the jacket from the core, a pair of stripping elements movable into a position adjacent to the compressing members and beneath the loop in said cordage, means for actuating said transfer members for lowering said loop over said stripping elements, means for actuating said stripping elements to cause them to engage and move the jacket and the core in opposite directions to strip the jacket from said core throughout the remaining length of said section of cordage, means for moving said cordage supporting arms to and from said inner and said outer positions, cutting means on each of said arms, means for actuating said cutting means when said cordage supporting arms are in said inner positions for cutting the stripped portion of the jacket at the ends of said section of cordage to sever the stripped portion of the jacket from said cordage, and means for effecting the actuation of the various means in timed relation to each other.

15. An apparatus for stripping the jacket from the core of jacketed cordage, which comprises supporting means including a pair of arms mounted in spaced relation to each other for movement toward and away from each other to and from normal outer positions and inner positions for supporting a section of cordage for intermittent horizontal movement along a substantially straight line and for limited vertical movement thereof, means on said arms for moving said cordage vertically from a normal lower position to an upper position and for gripping the cordage to support therebetween a section of said cordage from which the jacket is to be stripped, a stationary compressing member disposed between said arms and to one side of the section of cordage, a movable compressing member disposed above said stationary compressing member and having obliquely disposed guide surfaces engageable with said cordage for directing said cordage laterally into a position between said compressing members in response to movement of the cordage from said lower position to said upper position, means for actuating said movable compressing member to compress a portion of said section of cordage to form opposed bulged portions in the jacket, a cutter at one side of the stationary compressing member for cutting the bulged portion on one side of said core to weaken a portion of the jacket, means for actuating said cutter, gripping means at the opposite side of said compressing members for engaging the uncut bulged portion of said jacket for separating the weakened portion of the jacket from said core, means for actuating said gripping means, vertically movable transfer means disposed adjacent to said stationary compressing member and operable for engaging the cordage for limiting the lateral movement of said section of cordage to a position removed from between said compressing members during the separation of the weakened portion of the jacket from the core, a pair of stripping elements mounted for movement in opposite directions through predetermined paths from a position adjacent to the compressing members and beneath the separated portions of the jacket and the core, means for actuating said transfer means to lower the separated portion of the core into the path of one of said stripping elements, means for moving the separated portion of the jacket into the path of the other stripping element, means for actuating said stripping elements in opposite directions to strip the jacket from said core throughout the remaining length of said section of cordage, means for moving said arms to said inner positions during the latter stripping of the jacket to prevent the elongation of said core, cutters on said cordage supporting arms, and means for actuating said cutters when said arms are in said inner positions for cutting the stripped portion of the jacket at the ends of said section of cordage.

References Cited in the file of this patent
UNITED STATES PATENTS

| | | |
|---|---|---|
| 1,052,271 | Pessin | Feb. 4, 1913 |
| 1,554,916 | Jacobson | Sept. 22, 1925 |
| 1,929,915 | Deitz | Oct. 10, 1933 |
| 2,366,271 | Lerch | Jan. 2, 1945 |
| 2,521,688 | Cataldo | Sept. 12, 1950 |